(12) United States Patent
Hoppe et al.

(10) Patent No.: US 12,174,080 B2
(45) Date of Patent: Dec. 24, 2024

(54) ANGULAR POSITION SENSOR FOR DETERMINING AN ANGULAR POSITION AND/OR A TORQUE

(71) Applicant: Hella GmbH & Co. KGaA, Lippstadt (DE)

(72) Inventors: Steffen Hoppe, Lippstadt (DE); Holger Oberste-Freilinghaus, Bielefeld (DE); Martin Pankoke, Paderborn (DE); Eckart Wirries, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 351 days.

(21) Appl. No.: 17/811,102

(22) Filed: Jul. 7, 2022

(65) Prior Publication Data

US 2022/0334013 A1    Oct. 20, 2022

Related U.S. Application Data

(63) Continuation of application No. PCT/EP2020/087049, filed on Dec. 18, 2020.

(30) Foreign Application Priority Data

Jan. 19, 2020    (DE) ..................... 10 2020 100 319.6

(51) Int. Cl.
*G01L 3/04* (2006.01)
*B60R 16/027* (2006.01)
(Continued)

(52) U.S. Cl.
CPC .............. *G01L 3/04* (2013.01); *B60R 16/027* (2013.01); *B62D 6/10* (2013.01); *B62D 15/0215* (2013.01); *G01L 5/221* (2013.01)

(58) Field of Classification Search
CPC ......... G01L 3/04; G01L 5/221; B60R 16/027; B62D 6/10; B62D 15/0215
See application file for complete search history.

(56) References Cited

U.S. PATENT DOCUMENTS

| | | | |
|---|---|---|---|
| 8,590,370 B2* | 11/2013 | Lee | G01M 17/007 73/117.02 |
| 2017/0350776 A1* | 12/2017 | Woo | G01L 3/101 |

(Continued)

FOREIGN PATENT DOCUMENTS

| | | |
|---|---|---|
| DE | 102008063951 A1 | 6/2010 |
| DE | 102009045435 A1 | 4/2011 |

(Continued)

OTHER PUBLICATIONS

EP-2743662-A1, English Translation (Year: 2014).*

*Primary Examiner* — Ryan D Walsh
(74) *Attorney, Agent, or Firm* — Husch Blackwell LLP

(57) ABSTRACT

An angular position sensor may include a housing, and a rotor including a rotor assembly with a rotor latching device. The rotor and the housing are connected by the rotor latching device secured by a retaining ring. The retaining ring can be transferred into a secured position in an axial direction. The retaining ring is integral with the rotor assembly and features at least one retaining element with which the retaining ring secures the connection of rotor and housing. The retaining ring and the rotor latching device each feature corresponding latching elements. The rotor assembly features axial position-securing elements. The latching elements interact such that the retaining ring is secured in an axial direction along the rotary axis relative to the rotor. The axial position-securing elements interact so that the rotor is secured essentially free of play on the housing in an axial direction along the rotary axis.

12 Claims, 12 Drawing Sheets

(51) Int. Cl.
    *B62D 6/10*         (2006.01)
    *B62D 15/02*      (2006.01)
    *G01L 5/22*        (2006.01)

(56) References Cited

U.S. PATENT DOCUMENTS

| | | | | |
|---|---|---|---|---|
| 2020/0348196 | A1* | 11/2020 | Son | G01D 11/16 |
| 2023/0110805 | A1* | 4/2023 | Pankoke | G01D 5/24423 |
| | | | | 174/50 |
| 2023/0278621 | A1* | 9/2023 | Zhang | B62D 6/10 |
| | | | | 180/443 |

FOREIGN PATENT DOCUMENTS

| | | | |
|---|---|---|---|
| DE | 102012021137 A1 | | 4/2014 |
| DE | 102012105963 A1 | | 5/2014 |
| DE | 102012105966 A1 | | 5/2014 |
| EP | 2743662 A1 * | 6/2014 | ............... B62D 6/10 |

* cited by examiner

ANGULAR POSITION SENSOR FOR DETERMINING AN ANGULAR POSITION AND/OR A TORQUE

CROSS REFERENCE

This application is a continuation of and claims priority to PCT Application No. PCT/EP2020/087049, filed Dec. 18, 2020, which itself claims priority to German Application No. 10 2020 100319.6, filed Jan. 9, 2020, the entireties of both of which is hereby incorporated by reference

FIELD OF THE INVENTION

The present invention relates to angular position sensor for determining an angular position and/or of a torque.

BACKGROUND OF THE INVENTION

Numerous embodiments of such angular position sensors are known from the state of the art. For example, DE 10 2012 105 963 A1 discloses an angular position sensor for determining a relative angle setting in relation to a reference position, comprising a housing, at least one rotor that is mounted on a bearing in the housing such that it can rotate and a printed circuit board with electric and/or electronic components and one or several stators matching the number of rotors. Among other things, the known angular position sensor should ensure precise alignment of a first one of the rotors to the stator. This is achieved by a first one of the rotors is latched to the housing without play, where a spring washer is arranged pretensioned on latching arms.

BRIEF SUMMARY OF THE INVENTION

The present invention is based on the task of improving angular position sensor for determining an angular position and/or a torque.

This task is solved by an angular position sensor that is characterized in that the retaining ring is an integral part of the rotor assembly and features at least one retaining element with which the retaining ring in its secured position secures the connection of rotor and housing, and where the retaining ring and the rotor latching device each feature latching elements to each other and the rotor assembly features axial position-securing elements, and where the latching elements interact in the secured position of the retaining ring in such a way that the retaining ring is secured in an axial direction along the rotary axis relative to the rotor, and where the axial position-securing elements interact in the secured position of the retaining ring in such a way that the rotor is secured essentially free of play on the housing in an axial direction along the rotary axis. The term "latching element" should be interpreted broadly in this context and also comprises press-fit elements.

One material advantage of the inventive angular position sensor is in particular the fact that the angular position sensor is improved. For example, the inventive angular position sensor can be manufactured in an easier and more cost-effective manner as the joining of a retaining ring designed as a separate spring washer and the welding of a retaining ring in the form of a holding ring is no longer necessary. Furthermore, the at least one retaining element of the retaining ring in combination with the axial position-securing elements of the rotor assembly ensures firstly a secure connection between the rotor and the housing and secondly securing of the rotor to the housing in a way that is essentially free of play.

One advantageous refinement of the inventive angular position sensor specifies that the housing features a housing latching device corresponding to the rotor latching device of the rotor, where the rotor and the housing are latched to each other by means of the rotor latching device and the housing latching device in the installed position of the rotor and such latching is secured by means of the retaining ring, and where the retaining ring with the retaining element in the secured position grips the rotor latching device in such a way that the latching of rotor and housing is secured. This implements the connection between the rotor on the one side and the housing on the other side using a simple and robust design.

One especially advantageous refinement of the inventive angular position sensor specifies that the retaining ring and the rotor latching device feature torque transmission devices corresponding to each other, where the torque transmission devices are designed in such a way that a torque can be transmitted around the rotary axis by means of the torque transmission devices. In this way, the torque transmission is reliably ensured between the rotor latching device and the retaining ring, i.e. within the rotor assembly of the rotor. In addition, this effectively relieves the latching elements for connecting the rotor latching device and the retaining ring with regard to its mechanical load.

In principle, it is conceivable that the rotor latching device and/or the retaining ring are/is designed as a separate component. One advantageous refinement of the inventive angular position sensor specifies that the rotor latching device and/or the retaining ring are/is designed to be a single-piece with the rotor. This reduces the number of components and thus simplifies stock keeping and logistics. It is, for example, conceivable that the rotor locking device and/or the retaining ring made of plastic and a rotor made of metal are bonded to each other to form one piece using a plastic injection molding process. In this respect, the rotor itself can be designed as one piece or several pieces.

One advantageous refinement of the aforementioned embodiment of the inventive angular position sensor provides that the rotor latching device and/or the retaining ring are/is designed as a plastic part, where the rotor latching device or the retaining ring surrounds the rotor in such a way that in the installed position of the rotor the stator is firstly protected from coming into direct contact with the rotor and secondly a visual inspection of the position of the rotor is made possible. In this way, effective protection especially of the stator from unintended damage by the rotor and at the same time it is possible to check the position of the rotor in a simple manner, using a camera, for example. This is important as with inductive measuring methods the alignment of the rotor relative to the stator play a decisive role in a high-quality measurement using the angular position sensor.

One further advantageous refinement of the inventive angular position sensor specifies that the rotor latching device, the retaining ring and the housing are designed to complement each other in such a way that the connection of the rotor with the housing in the installed position of the rotor can be checked by means of a visual inspection. A correct connection between the rotor and the housing is necessary for the proper functioning of the inventive angular position sensor even under adverse ambient conditions such as vibrations, changes in temperatures and the like. Using the angular position sensor in accordance with this refinement, it is easily possible to check the existence of a correct connection between the rotor and the housing by means of a camera, for example.

One especially advantageous refinement of the inventive angular position sensor specifies that the rotor latching device and/or the retaining ring are/is designed in such a way that the rotor latching device and/or the retaining ring can be manufactured in an injection molding process without the use of sliders. This makes it possible to implement the inventive angular position sensor in an especially easy and cost-effective manner.

Another advantageous refinement of the inventive angular position sensor specifies that the rotor latching device and the retaining ring feature adjusting devices corresponding to each other for automatically aligning the retaining ring relative to the rotor latching device when it is being transferred into its secured position. This simplifies the alignment of the retaining ring relative to the rotor latching device and thus ensures a correct connection between the retaining ring on the one hand and the rotor latching device on the other when transferring the retaining ring into its secured position.

One further advantageous refinement of the inventive angular position sensor specifies that the rotor latching device and/or the retaining ring feature/features lubricant traps filled with a lubricant that are arranged in such a way that movement of the rotor relative to the housing is promoted. This makes it possible to perform a low-wear and thus low-noise rotation of the rotor around the rotary axis.

Furthermore, a further advantageous refinement of the inventive angular position sensor specifies that the latching elements of the retaining ring are designed as locking hooks, the latching elements of the rotor latching device as detent openings and the axial position-securing elements of the rotor assembly as protrusions and/or shoulders arranged on the rotor latching device and on the retaining ring. In this way, it is firstly possible to implement a robust and simply designed connection of the retaining ring with the rotor latching device and at the same time a very compact arrangement of the axial position-securing elements.

An alternative advantageous refinement of the inventive angular position sensor specifies that the latching elements of the retaining ring are designed as press-fit elements, the latching elements of the rotor latching device as press-fit apertures and the axial position-securing elements of the rotor assembly as protrusions and/or shoulders arranged on the rotor latching device and on the retaining ring. This facilitates a very space-saving embodiment of the rotor assembly and thus of the angular position sensor.

A further advantageous refinement of the inventive angular position sensor specifies that the retaining ring is designed as an angular position detection element for determining the angular position, preferentially as an initial gearwheel. This further increases the functionality of the retaining ring. In addition, thus further reduces the number of component and the space needed.

BRIEF DESCRIPTION OF THE DRAWINGS

Reference is now made more particularly to the drawings, which illustrate the best presently known mode of carrying out the invention and wherein similar reference char-acters indicate the same parts throughout the views.

DETAILED DESCRIPTION OF THE INVENTION

A first sample embodiment of the inventive angular position sensor is shown in FIG. 1 through 18 and is explained in more detail in the following.

Figure 1:
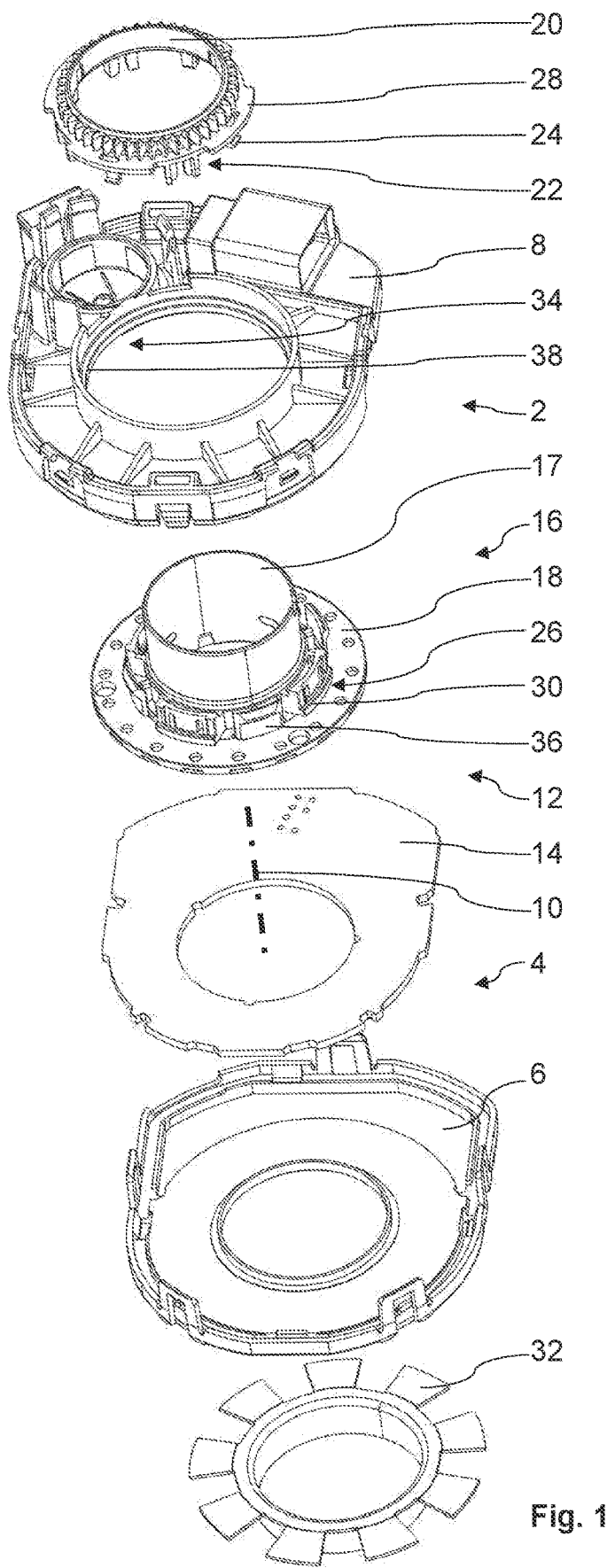
FIG. 1 is a first sample embodiment of the inventive angular position sensor in an exploded drawing.
Figure 2:
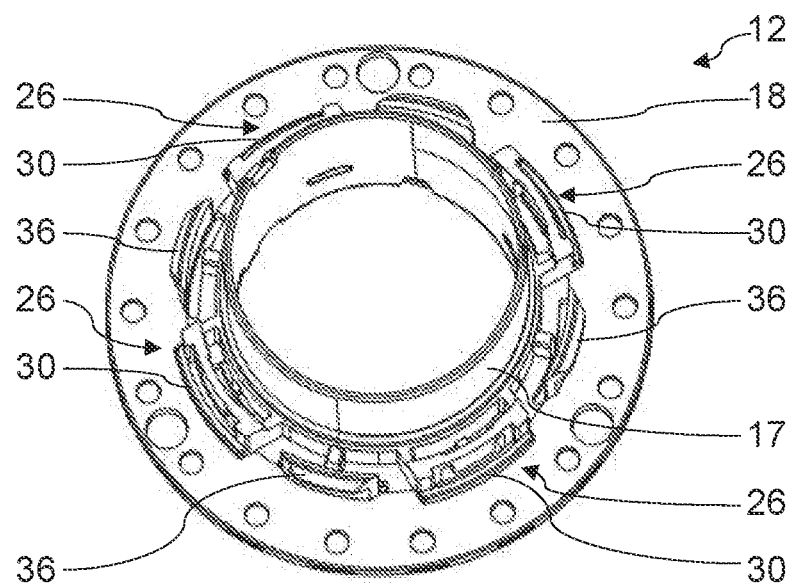
FIG. 2 illustrates the first sample embodiment in a partially perspective view, looking at the rotor latching device.
Figure 3:
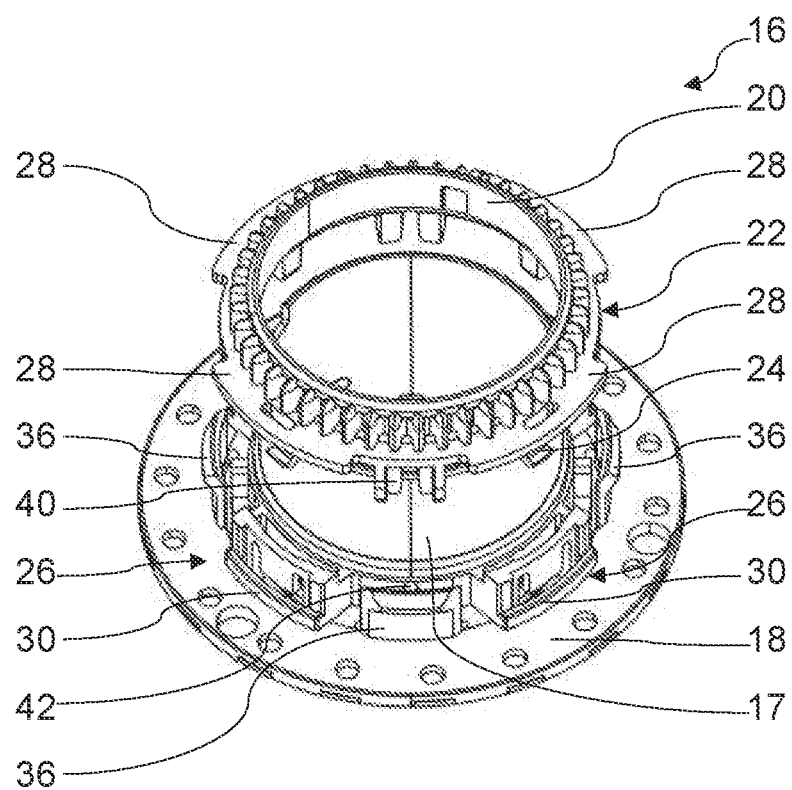
FIG. 3 illustrates the first sample embodiment in a partially perspective view, looking at the retaining ring and the rotor latching device, in a non-secured position of the retaining ring.
Figure 4:
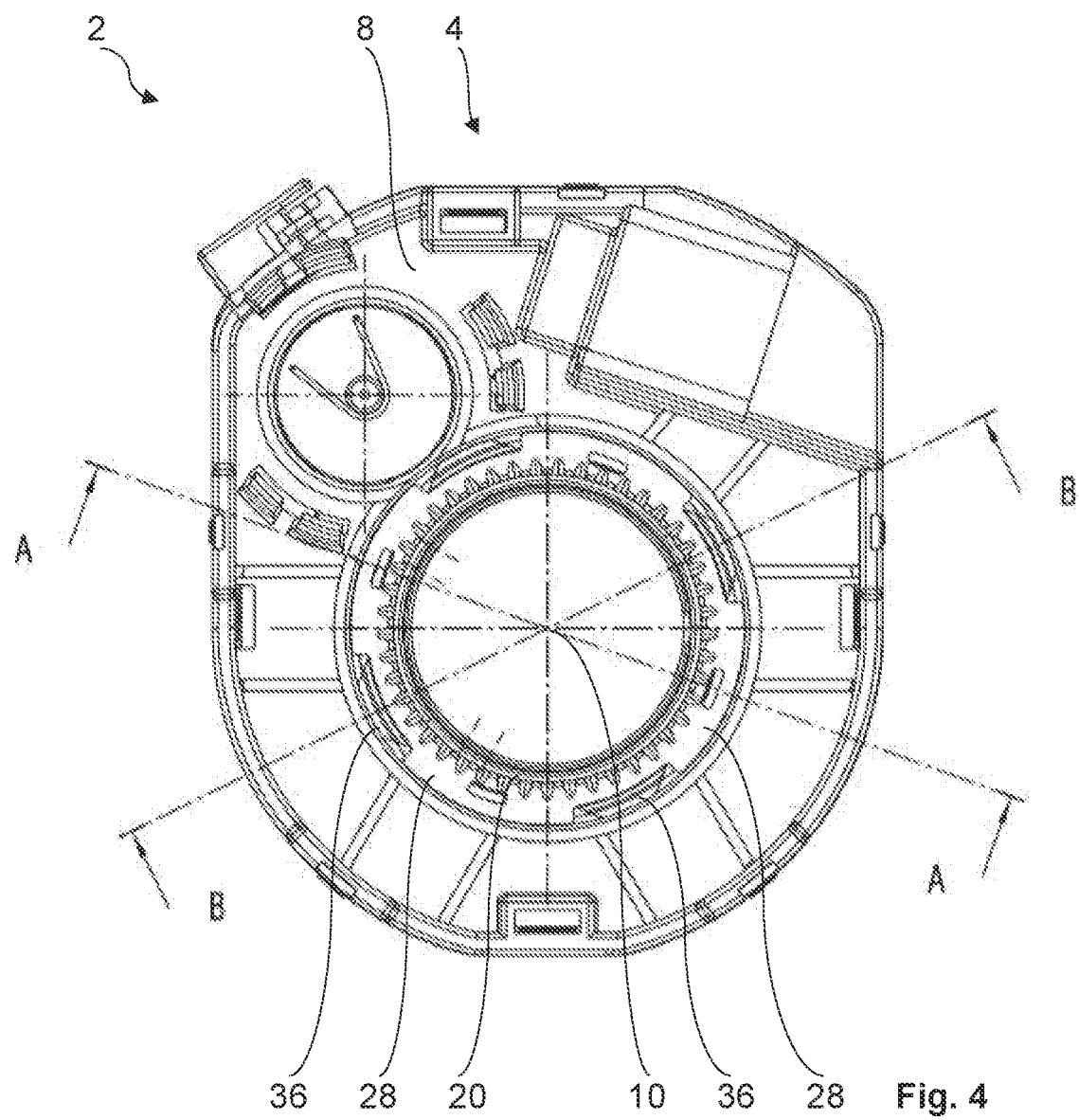
FIG. 4 illustrates the first sample embodiment in a top view, in the installed position of the rotor.
Figure 5:
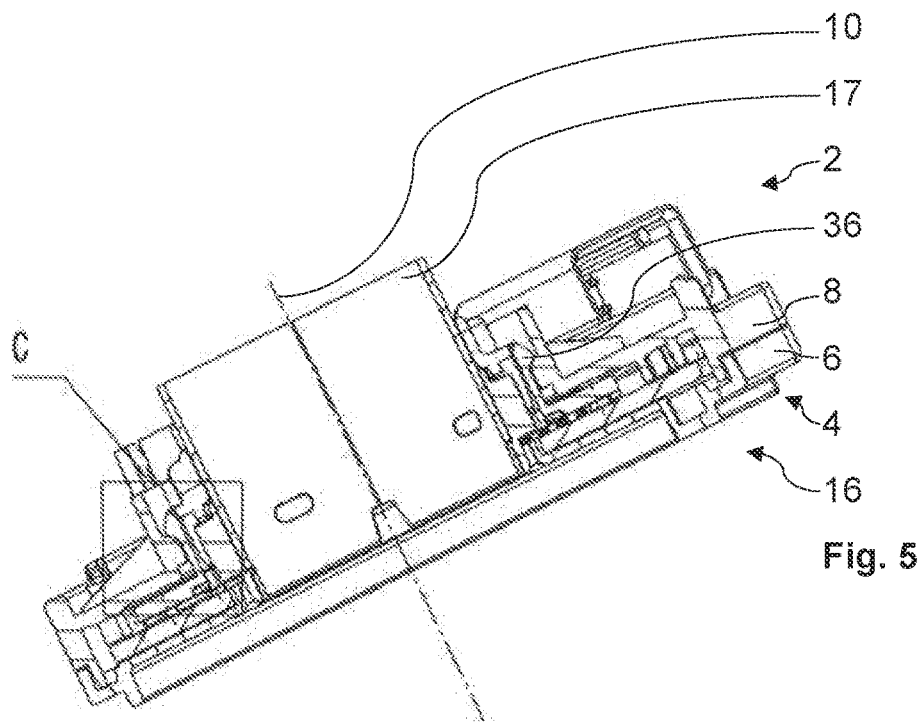
FIG. 5 illustrates the section B-B in FIG. 4.
Figure 6:
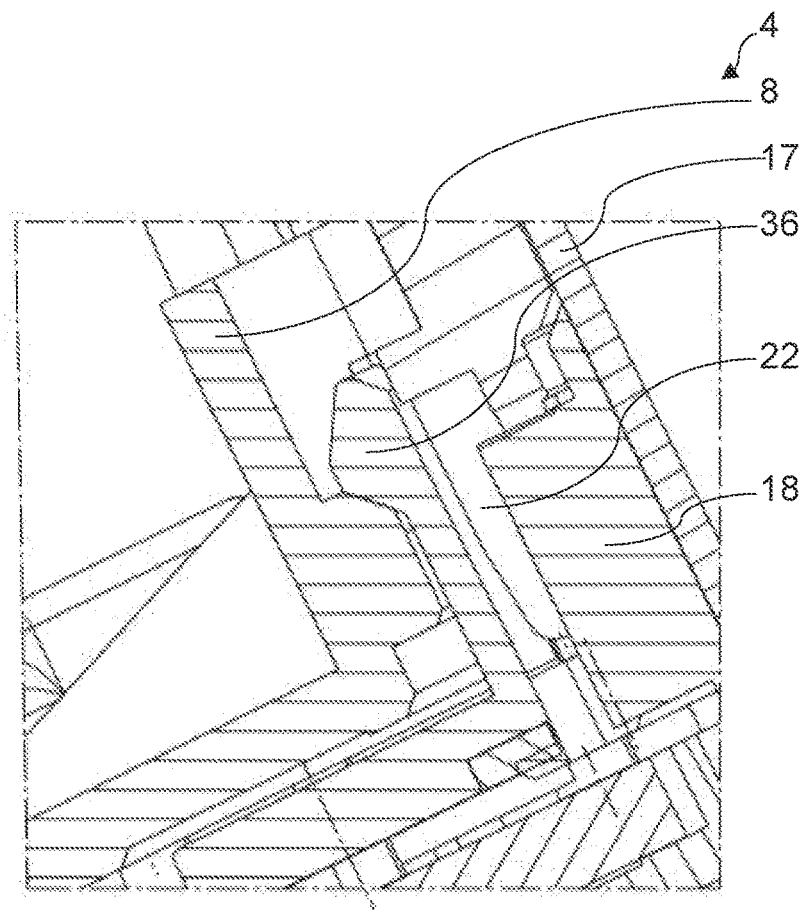
FIG. 6 illustrates the detail C in FIG. 5.
Figure 7:
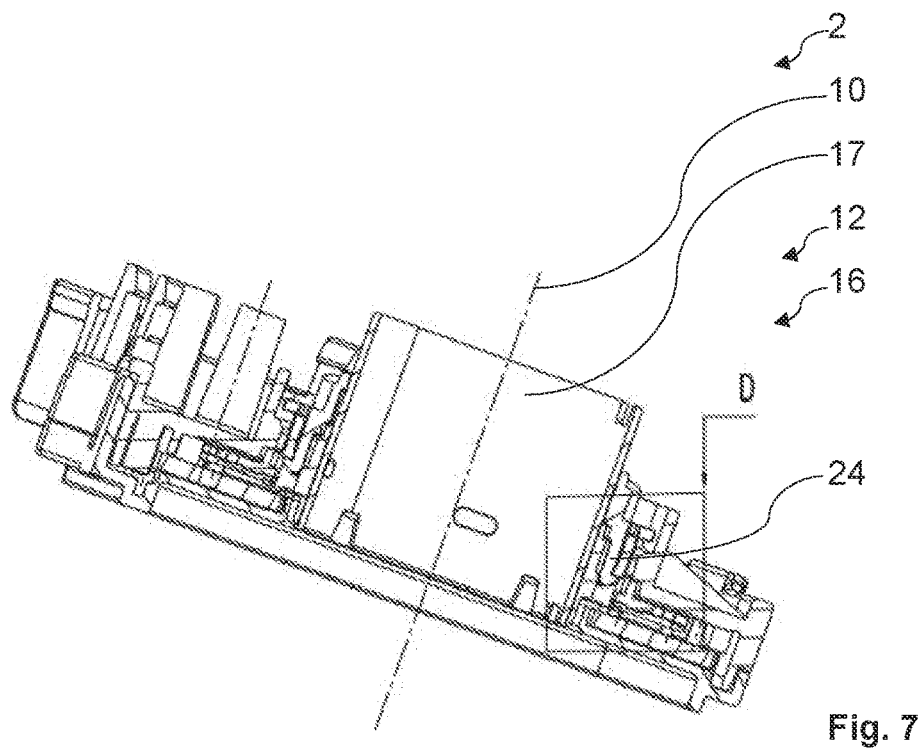
FIG. 7 illustrates the section A-A in FIG. 4.
Figure 8:
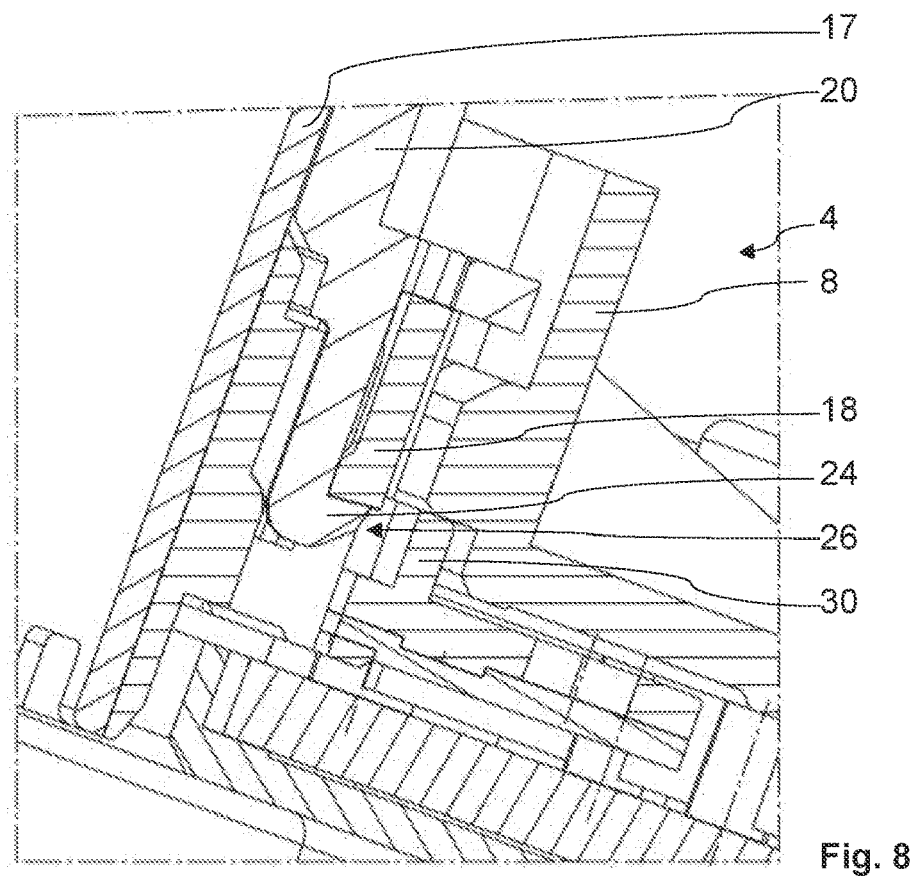
FIG. 8 illustrates the detail D in FIG. 7.
Figure 9:
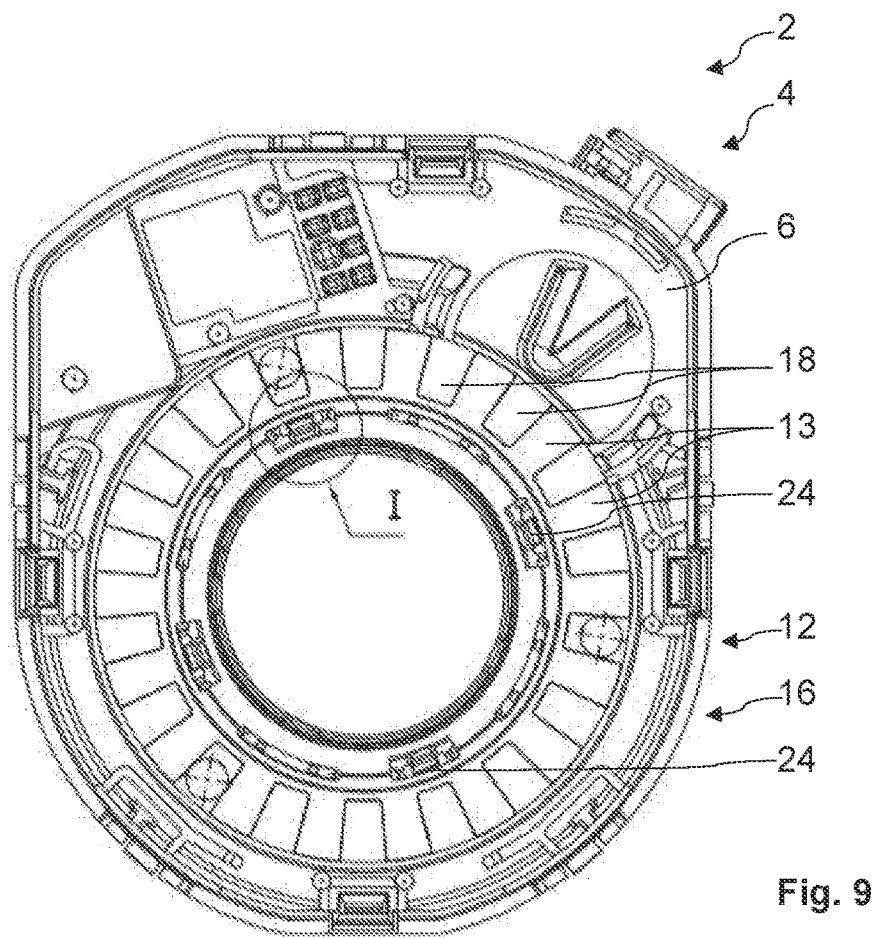
FIG. 9 illustrates the first sample embodiment in a bottom view, in the installed position of the rotor.
Figure 10:
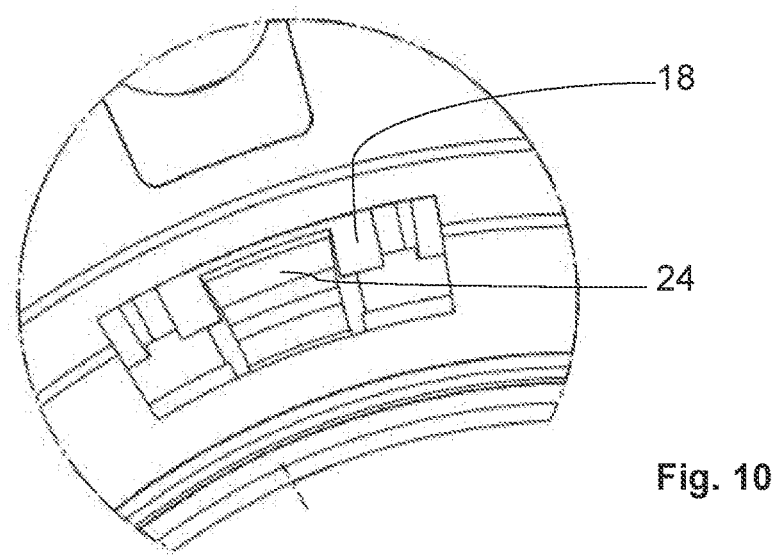
FIG. 10 illustrates the detail I in FIG. 9.
Figure 11:
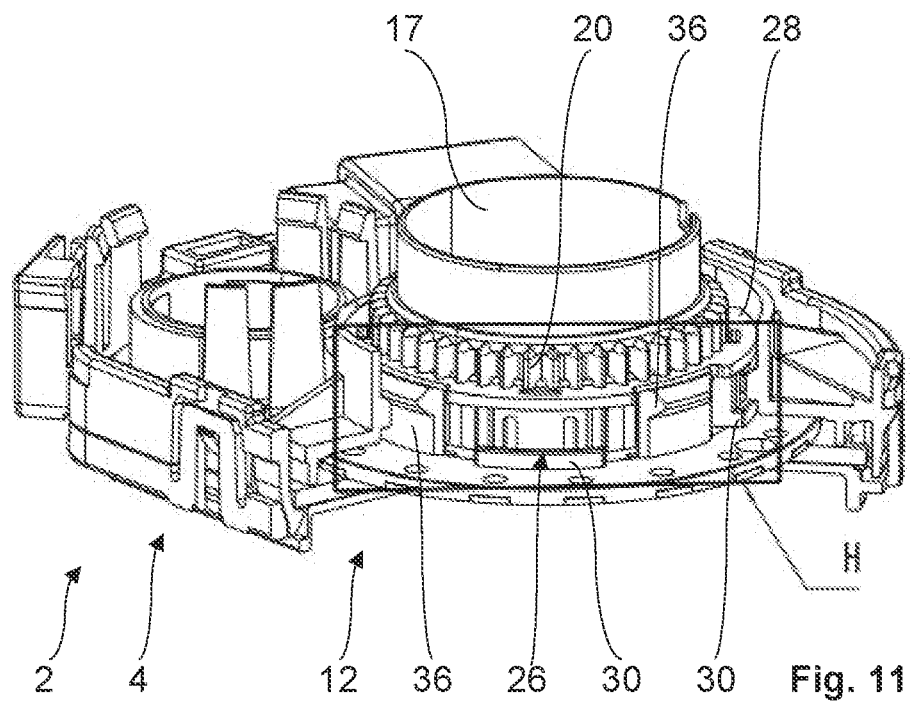
FIG. 11 illustrates the first sample embodiment in a partial cross-section perspective view, in the installed position of the rotor.
Figure 12:
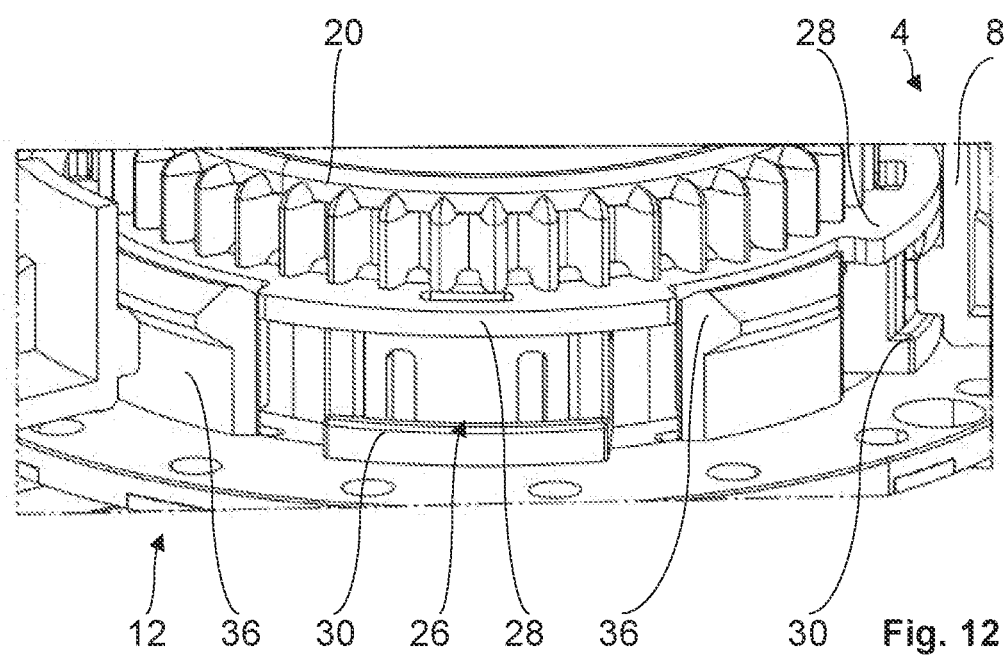
FIG. 12 illustrates the detail H in FIG. 11.
Figure 13:
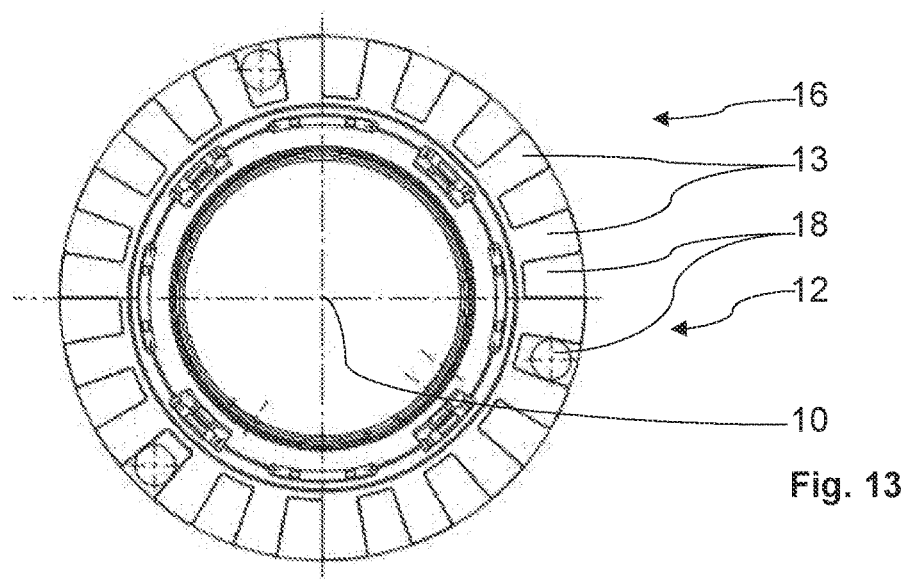
FIG. 13 illustrates the first sample embodiment in a bottom view, in the installed position of the rotor and without the housing.
Figure 14:
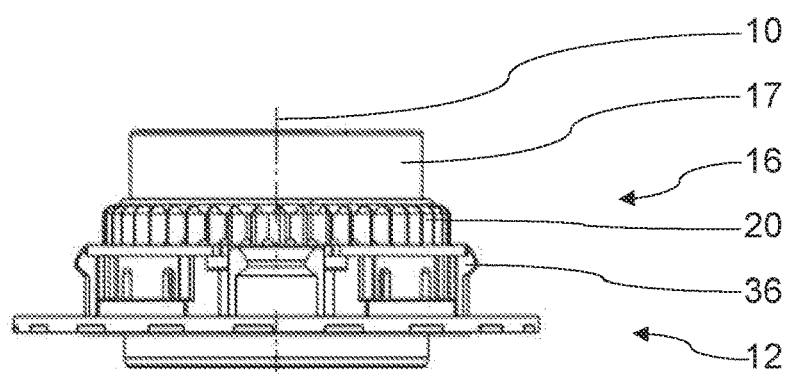
FIG. 14 illustrates the first sample embodiment in a side view, in the installed position of the rotor and without the housing.
Figure 15:
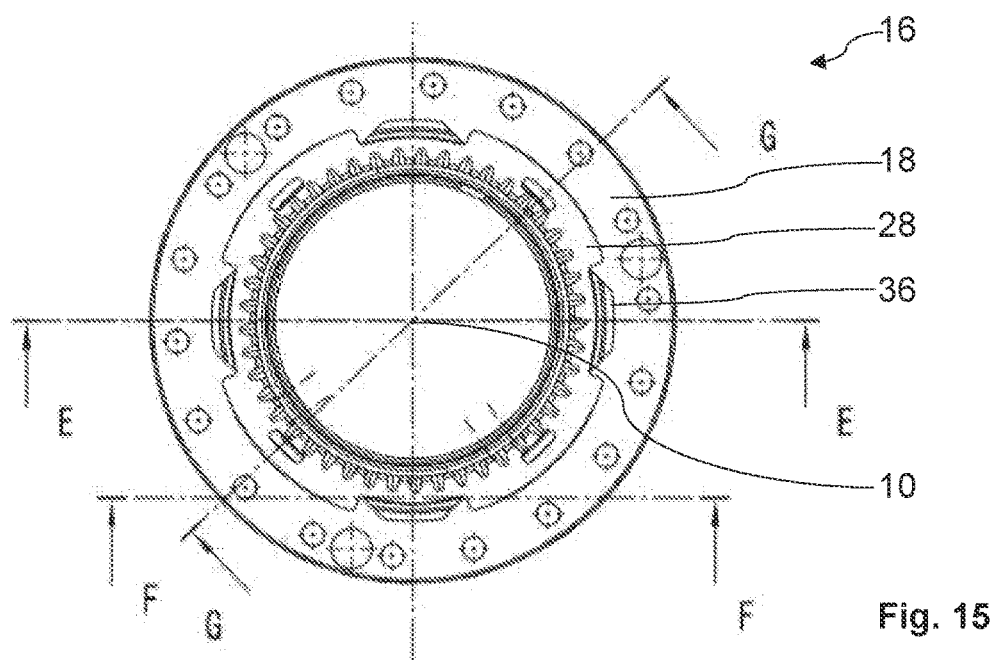
FIG. 15 illustrates the first sample embodiment in a top view, in the installed position of the rotor and without the housing.
Figure 16:
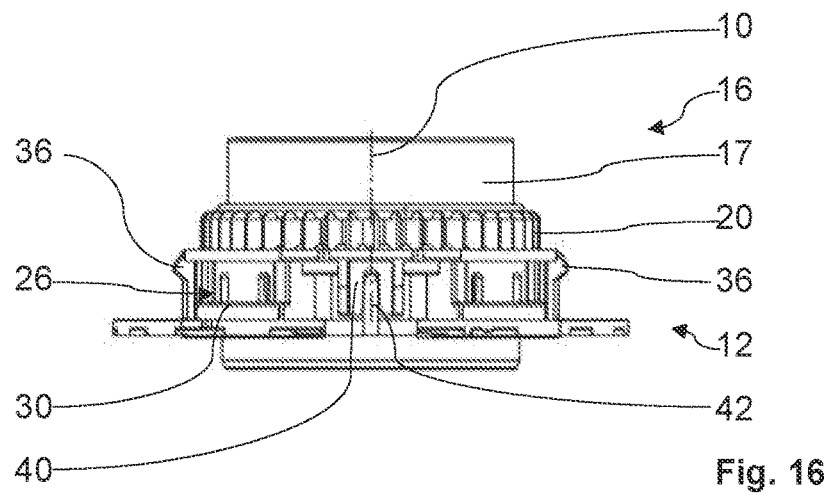
FIG. 16 illustrates the section F-F in FIG. 15.
Figure 17:
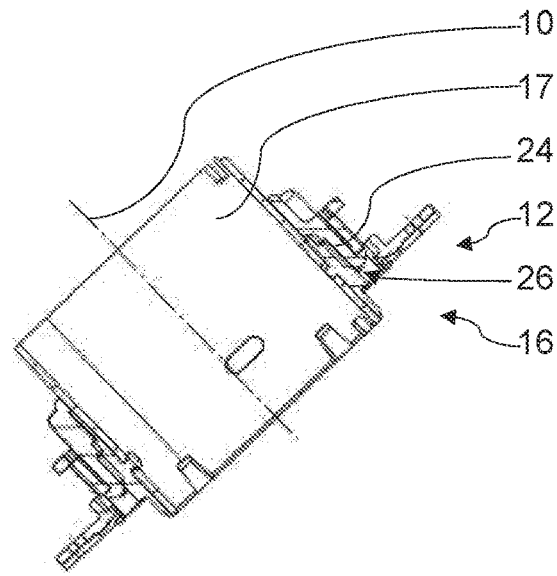
FIG. 17 illustrates the section G-G in FIG. 15.
Figure 18:
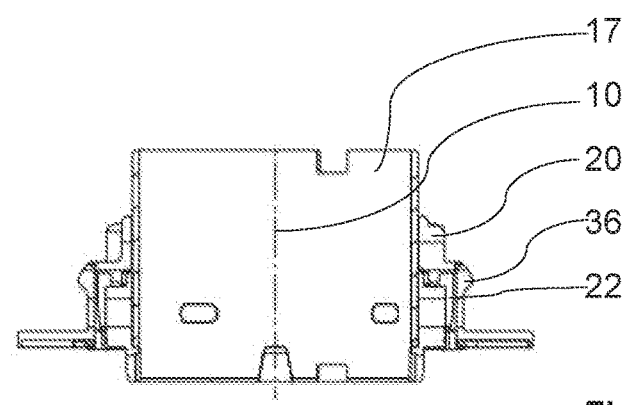
FIG. 18 illustrates the section E-E in FIG. 15.

In the present case, the angular position sensor 2 is an inductive steering-angle sensor and designed for determining an angular position sensor and shown in an exploded drawing in FIG. 1. The angular position sensor 2 comprises a housing 4 with a housing lower part 6 and a housing upper part 8, a rotor 12 arranged on the housing 4 to be rotatable around a rotary axis 10 and a printed circuit board 14 with at least one stator (not shown) corresponding to the rotor 12, where the rotor 12 features a rotor assembly 16 with a rotor latching device 18, and where the rotor 12 and the housing 4 are connected to each other by means of the rotor latching device 18 in a mounting position of the rotor 12 shown in FIGS. 4 through 12 and such connection is secured by means of a retaining ring 20, where the retaining ring 20 can be transferred into a secured position shown in FIGS. 4 through 18 in an axial direction to the same along the rotary axis 10.

The retaining ring 20 is an integral part of the rotor assembly 16 and in the present sample embodiment features a total of four retaining elements 22 with which the retaining ring 20 in its secured position secures the connection of rotor 12 and housing 4, where the retaining ring 20 and the rotor latching device 18 each feature latching elements 24, 26 corresponding to each other and the rotor assembly 16 features axial position-securing elements 28, 30, and where the latching elements 24, 26 interact in the secured position of the retaining ring 20 in such a way that the retaining ring 20 is secured in an axial direction along the rotary axis 10 relative to the rotor 12, and where the axial position-securing elements 28, 30 interact in the secured position of the retaining ring 20 in such a way that the rotor 12 is secured essentially free of play on the housing 4 in an axial direction along the rotary axis 10. In the present sample embodiment, the rotor latching device 18 and the retaining ring 20 each feature a total of four latching elements 24, 26 and each a total of four axial position-securing elements 28. 30. The latching elements 24 of the retaining ring 20 are designed as locking hooks, the latching elements 26 of the rotor latching device 18 as detent openings and the axial position-securing elements 28, 30 of the rotor assembly 16 are designed as shoulders 30 arranged on the rotor latching device 18 and as protrusions 28 arranged on the retaining ring 20.

Furthermore, the angular position sensor 2 features an additional rotor 32 that is designed in a way known to a specialist and arranged on the rest of the angular position sensor 2. The two rotors 12, 32 are necessary in order to also determine the torque of a steering shaft (not shown) of a vehicle (likewise not shown) in addition to the angular position; a steering shaft on which the angular position sensor 2 is arranged. Over and above this, the retaining ring 20 is designed at the same time as an angular position detection element for determining the angular position, namely as an initial gearwheel. This makes it possible to implement a counter function by means of which, for example, also multiple rotations of the steering shaft can be determined.

To connect the rotor 12 with housing 4, the housing 4 features a housing latching device 34 corresponding to the rotor latching device 18 of the rotor 12, where the rotor 12 and the housing 4 by means of which the rotor latching device 18 and the housing latching device 34 are latched to each other in the installed position of the rotor 12. For this purpose, the rotor latching device 18 features a total of four locking hooks 36 that engage with a locking shoulder 38 of the housing latching device 34 in the mounting position of the rotor 12. This latching is secured by means of the retaining ring 20, where the retaining ring 20 with the retaining elements 22 engages in the rotor latching device 18 in the secured position in such a way that the latching of rotor 12 and housing 4 is secured.

Furthermore, the retaining device 22 of the retaining ring 20 and the contours (not shown in more detail) of the rotor latching device 18 are designed as torque transmission devices corresponding to each other, where the torque transmission devices are designed in such a way that a torque can be transmitted around the rotary axis 10 by means of the torque transmission device. The rotor latching device 18 is designed as single-piece part with the rotor 12, where the rotor latching device 18 is designed as a plastic part and surrounds the rotor 12 in such a way that in the mounting position of the rotor 12 the stator is firstly protected from coming into direct contact with the rotor 12 and secondly a visual inspection of the position of the rotor 12 is made possible. For this, see in particular FIGS. 9 and 13 from which the rotor 12 made of metal injection-molded with the rotor latching device 18 can be seen. The rotor 12 features rotor blades 13 and is not completely surrounded by the rotor latching device 18 made of plastic on its side facing the stator on the printed circuit board 14. However, the rotor latching device 18 made of plastic protrudes on the sides of the rotor 12, namely at the sides of each of the rotor blades 13 or the rotor 12, in the direction of the printed circuit board 14 over the rotor 12, namely its rotor blade 13, such that a direct contact of the rotor 12 with the stator is effectively prevented. At the same time, the correct position of the rotor 12 can be checked easily by means of a camera or the like, which not be possible if the rotor 12, especially its rotor blades 13, was fully surrounded by the rotor latching device 18 made of plastic. The rotor blades 13 of the rotor 12 are arranged at a tube-like part 17 of the rotor 12 and are designed, for example, as a press-bent component made from one sheet.

The rotor latching device 18 made of plastic is, for example, designed as an injection molded plastic part that is molded onto rotor 12. In this respect, the rotor latching device 18 in the present sample embodiment is designed in such a way that the rotor latching device 18 can be manufactured in an injection molding process without the use of sliders. For this, see in particular FIG. 2 from which it can be seen that production of the rotor latching device 18 in the aforementioned manner is possible. For example, a three-part injection molding tool can be used for this purpose in which a part forms the detent openings 26 in the rotor latching device 18 visible from FIG. 2 and arranged behind the locking hooks 36 during the injection molding process. This part can be extended first such that the locking hooks 36 can expand into the space formed by the same when removing the rotor 12 with the rotor latching device 18 molded onto it.

In a similar way, in the present sample embodiment, it is also possible to check the connection of the rotor 12 with the housing 4 in the mounting position of the rotor 12 by means of a visual inspection, for example by means of a camera or the like. For this purpose, the rotor latching device 18, the retaining ring 10 and the housing 4 are designed to be coordinated with each other. To this end, see in particular FIGS. 9 and 10 from which it can be seen that the aforementioned visual inspection of the correct connection of the rotor 12 with the housing 4, namely correct latching of the locking hooks 36 of the rotor latching device 18 with the locking shoulder 38 of the housing latching device 34, is made possible in the present sample embodiment.

In order to ensure correct alignment of the retaining ring 20 relative to the rotor latching device 18 and thus to the rotor 12 when transferring the retaining ring 20 into its secured position, the rotor latching device 18 and the retaining ring 20 feature adjusting devices 40, 42 corresponding to each other for automatically aligning the retaining ring 20 relative to the rotor latching device 18 when it is being transferred into its secured position. For this purpose, the retaining ring 20 features a total of four fork-shaped adjusting devices 40 and the retaining ring a total of four strut-shaped adjusting devices 42. In this context, see in particular FIGS. 3 and 16.

How the inventive angular position sensor according to the present sample embodiment is assembled is explained in more detail in the following and on the basis of FIGS. 1 through 18.

Initially, the angular position sensor 2 is in a non-installed position of the rotor 12, as can be seen from FIG. 1. The individual parts of the angular position sensor 2 are then connected to each other in the sequence as shown in FIG. 1. When doing so, the rotor 2 with the rotor latching device molded to it 18 is connected to the housing 4. For this purpose, the locking hooks 36 of the rotor latching device 18 caused to engage with the locking shoulder 38 of the housing latching device 34 of the housing 4, namely latched to each other. Then the retaining ring 20 is connected with the rotor latching device 18. In doing so, the retaining ring 20 is transferred into its secured position, where the locking hooks 24 of the retaining ring 20 engage with the detent openings 26 of the rotor latching device 18 and latch with the rotor latching device 18. In the secured position of the retaining ring 20, the retaining elements 22 of the retaining ring 20 grip the back of the locking hooks 36 of the rotor latching device 18 such that the locking hooks 36 are secured in their position and thus also the aforementioned latching of the rotor 12 with the housing 4 is secured. At the same time, the axial position-securing elements 28, 30 of the retaining ring 20 and the rotor latching device 18 ensure that the rotor 12 is secured essentially free of play on the housing 4 in an axial direction along the rotary axis 10.

One material advantage of the inventive angular position sensor according to the present embodiment is in particular the fact that the angular position sensor 2 can be manufactured in an easy and cost-effective manner as the joining of a retaining ring designed as a separate spring washer and the welding of a retaining ring in the form of a holding ring is no longer necessary. Furthermore, the at least one retaining element 22 of the retaining ring 20 in combination with the axial position-securing elements 28, 30 of the rotor assembly 16 ensures firstly a secure connection between the rotor 12 and the housing 4 and secondly securing of the rotor 12 to the housing in a way that is essentially free of play 4.

FIGS. 19a-c, 20a-c and 21a-c each show a further sample embodiment of the inventive angular position sensor. These further sample embodiments have been explained in the following only to the extent that they deviate from the sample embodiment mentioned above in each case. Otherwise, reference is made to the statements on the preceding sample embodiments. Identical and functionally identical components have the same reference signs.

Figure 19A:
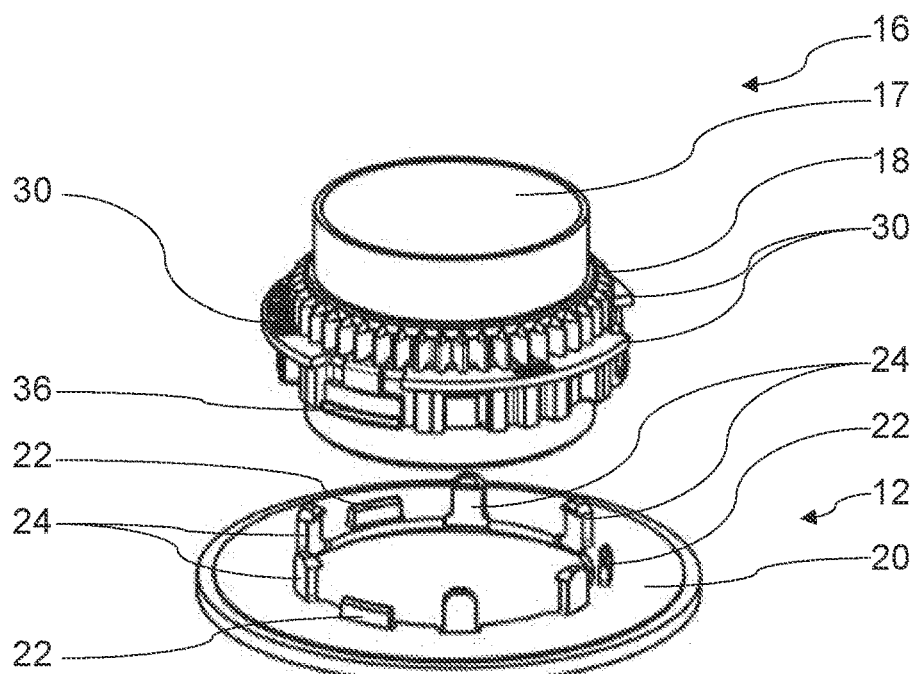
FIGS. 19a through 19c illustrate a second sample embodiment of the inventive angular position sensor in grossly simplified and partial representations.
Figure 19B:
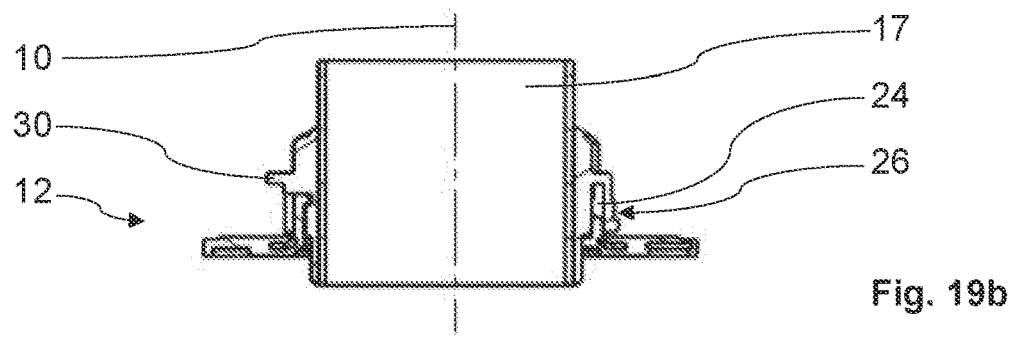
Figure 19C:
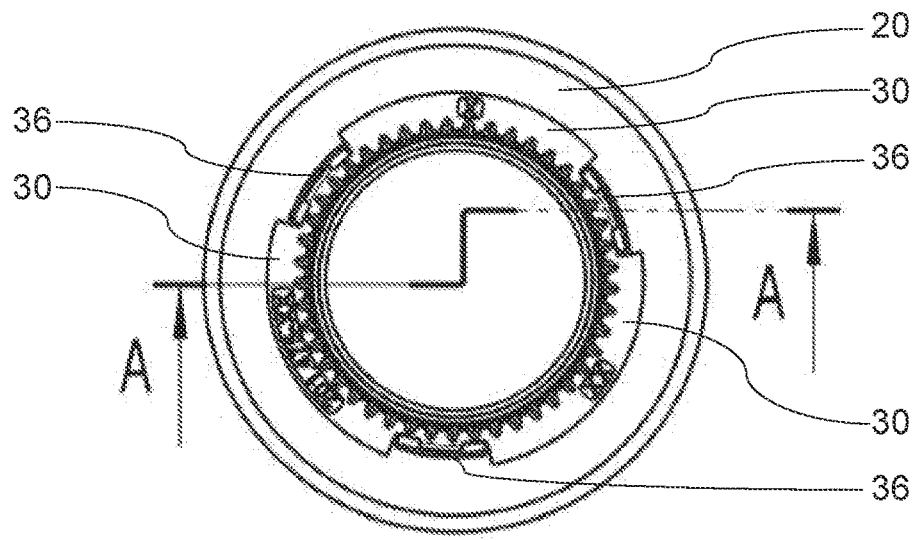

FIGS. 19a through 19c show a second sample embodiment of the inventive angular position sensor. FIG. 19a shows a perspective view, FIG. 19b a side section along the reference line A-A in FIG. 19c and FIG. 19c a top view. The angular position sensor 2 according to this sample embodiment differs from the angular position sensor 2 according to the first sample embodiment in that the rotor blades of the rotor 12 are not partially surrounded by the rotor latching device 18 but by the retaining ring 20 of the rotor assembly 16, for example in the manner described above. Over and above this, the rotor latching device 18 is permanently connected to the tube-like part 17 of the rotor 12. For example, the rotor latching device 18 made of plastic is molded in a similar way to the above to the tube-like part 17 of the rotor 12. The locking hooks 24 of the retaining ring 20 point in the direction of the rotary axis 10, which simplifies the manufacture of the retaining ring 20, for example as an injection molded plastic part. In contrast to the first sample embodiment, the locking hooks 36 of the rotor latching device 18 are, instead of the axial position-securing elements 30 according to the first sample embodiment, designed to be at the same time axial position-securing elements of the rotor latching device 18. These axial position-securing elements 36 interact in the manner already described above with the corresponding axial position-securing elements 30 of the rotor latching device 18. This means that, unlike with the first sample embodiment, both axial position-securing elements 36, 30 are arranged on the rotor latching device 18.

Figure 20A:
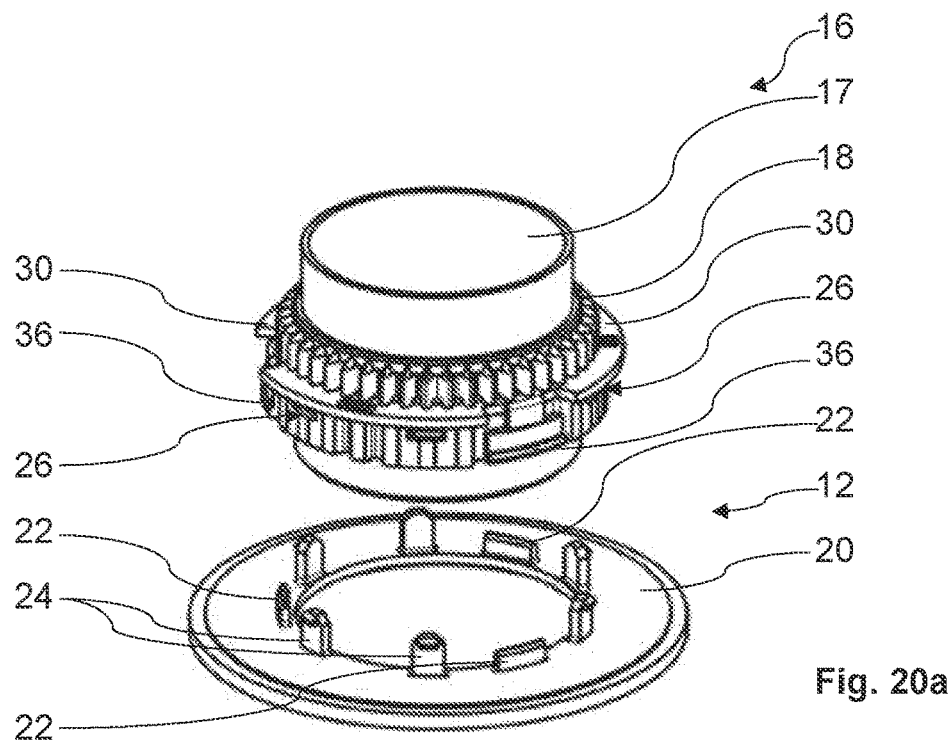
FIGS. 20a through 20c illustrate a third sample embodiment of the inventive angular position sensor in grossly simplified and partial representations.
Figure 20B:
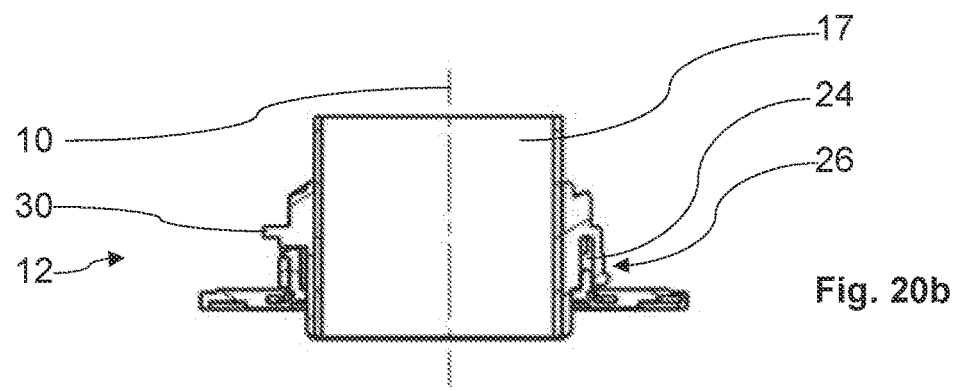
Figure 20C:
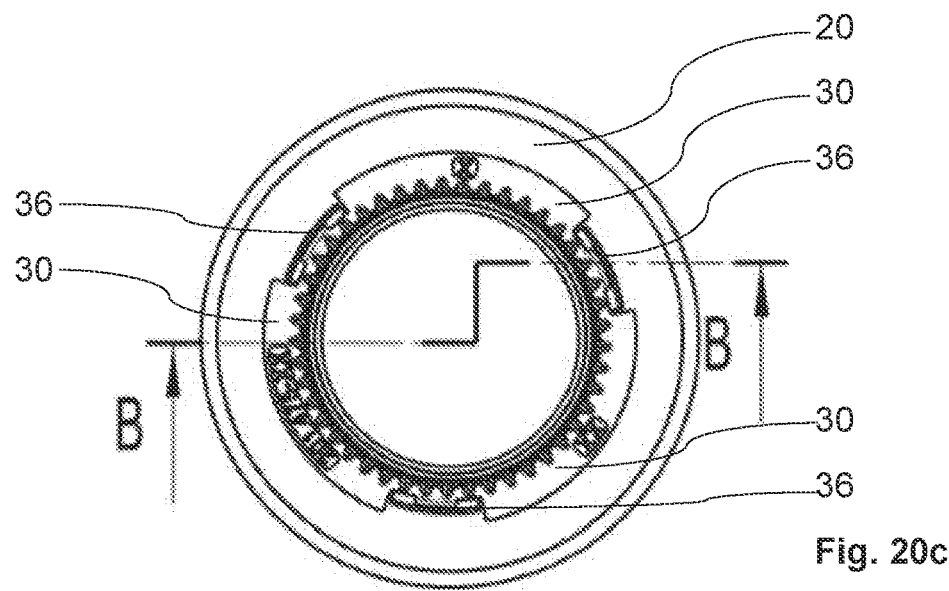

FIGS. 20a through 20c show a third sample embodiment of the inventive angular position sensor. FIG. 20a shows a perspective view, FIG. 20b a side section along the reference line B-B in FIG. 20c and FIG. 20c a top view. The third sample embodiment essentially corresponds to the second sample embodiment such that reference can be made to a large extent to the above statements on the second sample embodiment. In contrast to the second sample embodiment, the locking hooks 24 of the retaining ring 20 of the angular position sensor 2 according to the third sample embodiment point away from the rotary axis 10.

Figure 21A:
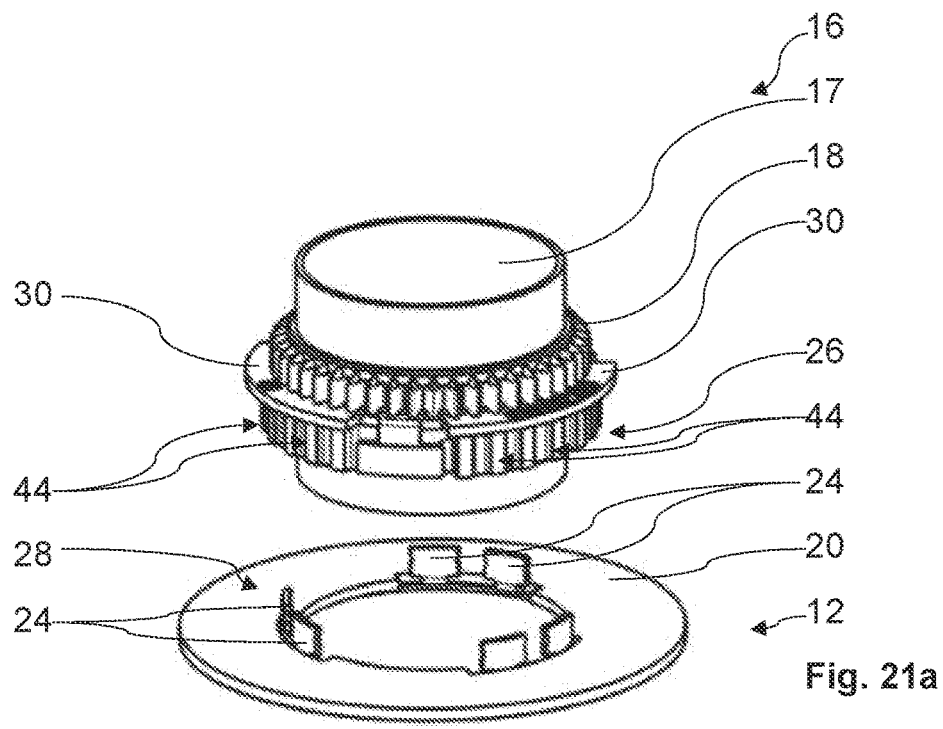
FIGS. 21a through 21c illustrate a fourth sample embodiment of the inventive angular position sensor in grossly simplified and partial representations.
Figure 21B:
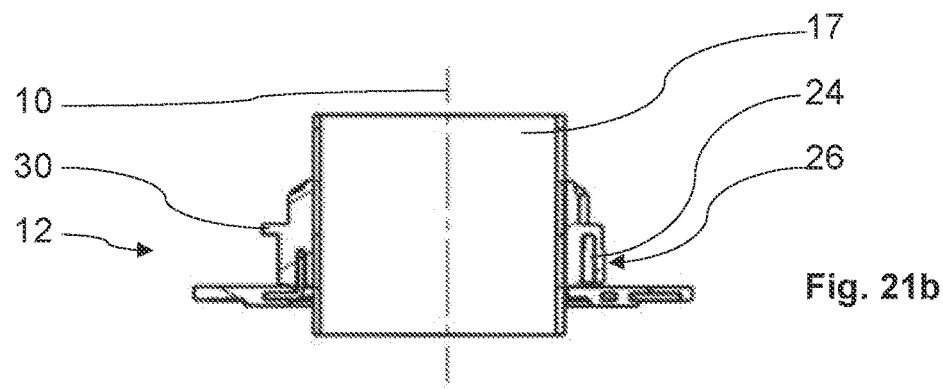
Figure 21C:
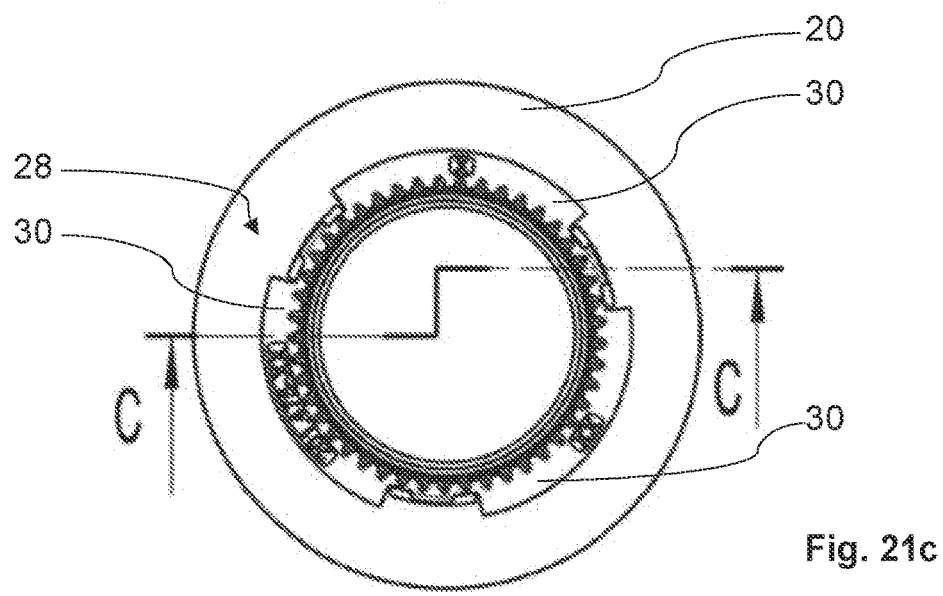

FIGS. 21a through 21c show a fourth sample embodiment of the inventive angular position sensor. FIG. 21a shows a perspective view, FIG. 21b a side section along the reference line C-C in FIG. 21c and FIG. 21c a top view. The angular position sensor 2 according to the fourth sample embodiment differs from the aforementioned sample embodiment specifically in that the latching elements 24 of the retaining ring 20 are designed as press-fit elements and the latching elements 26 of the rotor latching device 18 as press-fit apertures. Differing from the preceding sample embodiment, a surface of the retaining ring 20 visible in FIGS. 21a and 21c is designed, instead of the axial position-securing elements 28 according to the first sample embodiment, to be at the same time an axial position-securing element 28. This axial position-securing element 28 interacts in the manner already described above with the corresponding axial position-securing elements 30 of the rotor latching device 18. Furthermore, the rotor latching device 18 features lubricant traps 44 filled with a lubricant (not shown) that are arranged in such a way that movement of the rotor 12 relative to the housing 4 is promoted.

The invention is not limited to the present sample embodiments. For example, it is conceivable that the sample embodiments explained can be combined with each other in parts. Furthermore, the inventive angular position sensor can be advantageously deployed for a large number of differing applications. Over and above this, it is conceivable that the retaining ring and the rotor latching device feature torque transmission devices corresponding to each other that are designed to be separate from other elements of the retaining ring or the rotor latching device, for example separate from latching elements such as locking hooks or the like.

LIST OF REFERENCE NUMBERS

2 Angular position sensor
4 Housing
6 Housing lower part
8 Housing upper part
10 Rotary axis
12 Rotor
13 Rotor blade of the rotor 12
14 Printed circuit board
16 Rotor assembly
17 Tube-like part of the rotor 12
18 Rotor latching device
20 Retaining ring
22 Retaining elements
24 Latching elements of the retaining ring 20
26 Latching element of the rotor latching device 18
28 Axial position-securing elements of the retaining ring 20
30 Axial position securing elements of the rotor latching device 18
32 Additional rotor
34 Housing latching device
36 Latching locking hooks of the rotor latching device 18
38 Locking shoulder of the housing latching device 34
40 Fork-shaped adjusting devices of the retaining ring 20

42 Strut-shaped adjusting devices of the rotor latching device 18

44 Lubricant traps of the rotor latching device 18

The invention claimed is:

1. An angular position sensor for determining an angular position and/or a torque, the angular position sensor comprising:
  a housing,
  a rotor arranged on the housing to be rotatable around a rotary axis, the rotor including a rotor assembly with a rotor latching device, where the rotor and the housing are connected to each other by means of the rotor latching device in a mounting position of the rotor, where such connection is secured by a retaining ring, where the retaining ring is selectively moveable into a secured position in an axial direction to the same along the rotary axis,
  a printed circuit board with at least one stator corresponding to the rotor,
  wherein the retaining ring is integrally formed with the rotor assembly, and includes at least one retaining element with which the retaining ring in its secured position secures the connection of rotor and housing,
  wherein the retaining ring and the rotor latching device each include latching elements corresponding to each other, and the rotor assembly features axial position-securing elements,
  wherein the latching elements interact in the secured position of the retaining ring such that the retaining ring is secured in an axial direction along the rotary axis relative to the rotor, and
  where the axial position-securing elements interact in the secured position of the retaining ring such that the rotor is secured essentially free of play on the housing in an axial direction along the rotary axis.

2. The angular position sensor in accordance with claim 1, wherein the housing includes a housing latching device corresponding to the rotor latching device of the rotor, where the rotor and the housing are latched to each other by the rotor latching device and the housing latching device in the installed position of the rotor, and where such latching is secured by the retaining ring, and where the retaining ring with the retaining element in the secured position grips the rotor latching device such that the latching of rotor and housing is secured.

3. The angular position sensor in accordance with claim 1, wherein the retaining ring and the rotor latching device include torque transmission devices corresponding to each other, where the torque transmission devices are designed such that a torque can be transmitted around the rotary axis by the torque transmission device.

4. The angular position sensor in accordance with claim 1, wherein the rotor latching device and/or the retaining ring is/are as a single piece with the rotor.

5. The angular position sensor in accordance with claim 4, wherein the rotor latching device and/or the retaining ring are/is a plastic part, where the rotor latching device or the retaining ring surrounds the rotor such that in the installed position of the rotor the stator is protected from coming into direct contact with the rotor and a position of the rotor is visible.

6. The angular position sensor in accordance with claim 1, wherein the rotor latching device, the retaining ring and the housing are designed to complement such that the connection of the rotor with the housing can be checked in the installed position of the rotor by a visual inspection.

7. The angular position sensor in accordance with claim 1, wherein the rotor latching device and/or the retaining ring are/is designed such that the rotor latching device and/or the retaining ring can be manufactured in an injection molding process without the use of sliders.

8. The angular position sensor in accordance with claim 1, wherein the rotor latching device and the retaining ring include adjusting devices corresponding to each other for automatically aligning the retaining ring relative to the rotor latching device when it is being transferred into its secured position.

9. The angular position sensor in accordance with claim 1, wherein the rotor latching device and/or the retaining ring include(s) lubricant traps filled with a lubricant that are arranged such that a movement of the rotor relative to the housing is promoted.

10. The angular position sensor in accordance with claim 1, wherein the latching elements of the retaining ring are locking hooks, the latching elements of the rotor latching device are detent openings, and the axial position-securing elements of the rotor assembly are protrusions and/or shoulders arranged on the rotor latching device and the retaining ring.

11. The angular position sensor in accordance with claim 1, wherein the latching elements of the retaining ring are press-fit elements, the latching elements of the rotor latching device are press-fit apertures, and the axial position-securing elements of the rotor assembly are protrusions and/or shoulders arranged on the rotor latching device and the retaining ring.

12. The angular position sensor in accordance with claim 1, wherein the retaining ring is an angular position detection element for determining an angular position.

* * * * *